United States Patent [19]

Fukuda et al.

[11] 4,261,965
[45] Apr. 14, 1981

[54] BASIC ZINC COMPOUND FLAKE-LIKE CRYSTALLINE PARTICLE AND METHOD FOR PREPARATION THEREOF

[75] Inventors: Yoji Fukuda, Neyagawa; Tsuneharu Nitta, Katano; Tomizo Matsuoka, Neyagawa; Fumio Fukushima, Moriguchi; Shigeru Hayakawa, Hirakata, all of Japan

[73] Assignee: Matsushita Electric Industrial Co., Ltd., Japan

[21] Appl. No.: 48,462

[22] Filed: Jun. 14, 1979

Related U.S. Application Data

[63] Continuation-in-part of Ser. No. 864,447, Dec. 27, 1977, abandoned.

[51] Int. Cl.$^3$ .................... C01B 17/96; C01G 17/02
[52] U.S. Cl. ................................ 423/544; 423/622
[58] Field of Search ................ 423/544, 622, 106

[56] References Cited

U.S. PATENT DOCUMENTS

| | | | |
|---|---|---|---|
| 1,430,269 | 9/1922 | Waring | 423/106 |
| 1,444,484 | 2/1923 | Stevenson | 423/106 |
| 1,912,332 | 5/1933 | Steinbring | 423/106 |
| 2,602,727 | 6/1952 | Warinner | 423/544 |
| 3,136,647 | 6/1964 | Waitkins et al. | 423/544 |
| 3,545,994 | 12/1970 | Lott, Jr. et al. | 106/297 |
| 3,919,403 | 11/1975 | Pullen et al. | 423/556 |
| 4,069,299 | 1/1978 | Hodgson | 423/556 |

FOREIGN PATENT DOCUMENTS

| | | | |
|---|---|---|---|
| 572977 | 3/1959 | Canada | 423/106 |
| 2757914 | 7/1978 | Fed. Rep. of Germany | 423/544 |
| 513008 | 5/1976 | U.S.S.R. | 423/622 |

OTHER PUBLICATIONS

Gordon et al., Precipitation from Homogeneous Solution, John Wiley & Sons, Inc. NY, NY, 1959, pp. 1–11.
Skoog et al., Fundamentals of Analytical Chemistry, Holt Rinehart & Winston, NY, NY 1963, pp. 188–191.
Venkatewarlu, Precipitation of Zinc Hydroxide with Alkali and its Solubility in Aqueous Ammonia, Jour. Indian Chemical Society, vol. 30 #1, 1953, pp. 30-32.

*Primary Examiner*—O. R. Vertiz
*Assistant Examiner*—Gary P. Straub
*Attorney, Agent, or Firm*—Wenderoth, Lind & Ponack

[57] ABSTRACT

Basic zinc compound flake-like crystalline material suited for use in crystal-oriented electronic devices and method for preparation thereof comprising the steps of preparing a solution including at least zinc ions and sulfate ions, and causing precipitation of zinc sulfate crystals by causing a reaction of components of said solution with alkali when said solution is at a temperature in the range 50° to 100° C. and has a pH value of in the range 4 to 6.5.

6 Claims, No Drawings

BASIC ZINC COMPOUND FLAKE-LIKE CRYSTALLINE PARTICLE AND METHOD FOR PREPARATION THEREOF

This is a continuation-in-part application with respect to the application Ser. No. 864,447 now abandoned filed on Dec. 27, 1977 by the same inventors.

The present invention relates to a material constituted by flake-like crystalline particles of a basic zinc compound which are suitable for employment in or as starting material for a crystal-orientated electronic device, and to a method of preparation of said material.

One requirement for improvement of characteristics of electronic devices is improvement of characteristics of materials constituting these devices, and for this reason considerable attention has been given recently to crystal oriented materials, which are known to give advantages in many electronic applications. For example, it is known that reduced costs and increased ease of manufacture may be achieved by use of crystal-oriented materials rather than materials constituted by a random array of single crystals in surface acoustic wave filters, thin film, or ceramics, for example, and that there is less absorption and scattering of light if the fluorescent film material employed in a device such as a cathode ray tube is constituted by a crystal-oriented material. One form of crystal-oriented material is a material constituted by flake-like crystals. Known examples of such material include flake-like ferric oxide, $Fe_2O_3$, or manganese compounds, e.g., $MnOOH$, employed as hot-pressed material for magnetic heads in metering instruments or tape recording devices in which particularly good resistance to surface crumbling is demanded. Zinc compounds are known to provide advantages when employed in electronic devices, and there is accordingly a strong demand for crystal-oriented zinc material, but it has not yet been made possible to produce such material on an industrial basis.

There have been published a great many reports relating to zinc oxide, $ZnO$, and to obtaining of crystal-oriented material. For example, it is known that by cooling a concentrated solution of zinc sulfate, $ZnSO_4$, containing $ZnO$ there can be obtained a small amount of flake-like material having a composition which is basically $ZnSO_4 \cdot 3Zn(OH)_2 \cdot 4H_2O$. However, crystals thus obtained are very thin, and hence orientatability thereof is adversely affected if the material is converted to another material, in addition to which, since there is only a small yield, the process is unsuited to production on an industrial scale. According to another report, it is possible to obtain flake-like crystals by heating an aqueous solution of a zinc compound to 160° C. in a closed tube. However, this process, since it demands use of a special high-pressure container, presents problems of safety and cost in production on an industrial scale.

It is accordingly a principal object of the invention to provide a material and a method for preparation of material constituted by flake-like crystals of a zinc compound suitable for employment in a crystal-oriented electronic device.

It is a further object of the invention to provide a material suitable for employment as, or as starting material for, material for a crystal-oriented electronic device and constituted by flake-like crystals of a zinc compound having dimensions sufficiently great to permit resistance to change of form upon conversion of said material to or combination thereof with another material.

It is another object of the invention to provide a method permitting easy large-scale production of good quality crystal-oriented material constituted by flake-like zinc compound crystals.

These and other objects are achieved according to the invention by preparation of a material constituted by flake-like crystals which have the general formula $ZnSO_4 \cdot XZn(OH)_2$, X varying over the wide range of from 1.7 to 4.8, and in which ratio of thickness to diameter is from 1:5 to 1:300, thickness being up to 20 to 30 $\mu m$ and diameter in the range of from 1 $\mu m$ to a maximum of 300 $\mu m$. These dimensions ensure that the material may easily be combined with other materials or converted to corresponding oxides or sulfates without loss of characteristics, whereby the material of the invention has high industrial value, since by suitable treatment and combination there may be obtained crystal-oriented $ZnO$, $ZnS$, or ferrites, for example, the material being easily produced under comparatively low temperature conditions by a method which does not require special pressure-resistant or similar equipment and is described below.

The basis of the method of the invention for preparation of the above-described material, which was developed in the course of research on a variety of zinc compounds, is to cause sulfate ions to be present with zinc hydroxide produced from a solution containing zinc ions, to give an acid solution from which are precipitated crystals of a zinc hydroxide, which in this case contains sulfate radicals ($-SO_4$) and is basic zinc sulfate, these crystals being hexagonal and having a flake-like crystal habit.

In greater detail, a solution containing at least zinc ions and sulfate ions is heated to a temperature in the range 50° to 100° C. and while being maintained at this temperature is caused to react with ammonium ion obtained by hydrolyzing of urea, the solution being stirred constantly during this reaction. At the start of the reaction there is produced a precipitate which, however, is immediately dissolved as stirring of the solution continues, and after a certain amount of urea has been added stable deposition, i.e., deposition which is not followed by dissolution, of colorless, transparent flake-like hexagonal crystals having a diameter of up to several 100 $\mu m$ commences.

Zinc ions and sulfate ions ($SO_4{--}$) must be present in the starting solution, whose hydrogen ion concentration, pH, is initially in the approximate range 3.5 to 6.0. The pH of the solution increases gradually as alkali is added, and stable deposition of flake-like crystals commences when the pH of the solution is in the approximate range 4.0 to 6.5. For example, stable deposition starts when pH of the solution is about 4.6 if the starting solution employed is a zinc sulfate solution with a concentration of 1 mol/liter and by causing the ammonium ion obtained by hydrolyzing of urea to react with the zinc sulfate. Once stable deposition has started there is hardly any change of pH of the solution until deposition of product crystals is complete. This is because, when for example the added alkali is in the form of an ammonium compound, sulfate ions in the starting solution and subsequently added ammonium ions form ammonium sulfate, which together with ammonium constitute a buffer solution. This maintenance of pH of the solution at a generally constant level is an important aspect of the invention, since it makes possible the production of large crystals, of diameter of up to several 100 μm, as noted above, and ensures uniformity of quality of deposited crystals.

Generally, it is most advantageous to employ as the starting solution a zinc sulfate solution having a concentration of 0.1 to 6 mol/liter. Crystals obtained when concentration is less than 0.1 mol/liter are too small and thin. The upper limit of the concentration can be increased if the zinc sulfate is made more soluble with respect to water, but in terms of crystal production yield, 6 mol/liter is a suitable maximum.

Crystals meeting the objects of the invention are still produced if a portion of the zinc sulfate of the starting solution is replaced by another zinc salt, for example zinc nitrate, zinc acetate, or zinc chloride. It was found that size of flake-like crystals produced is more even and diameter to thickness ratio of the crystals is increased when a portion of the zinc sulfate of the starting solution is replaced by zinc nitrate. Substitution of zinc sulfate by zinc nitrate may be made up to a maximum value of 75 mol%. Higher proportions of zinc nitrate make it difficult to ensure production of flake-like crystals of uniform shape and hence are unsuitable. Replacing the zinc sulfate with up to 50 mol% zinc acetate or up to 25 mol% zinc chloride results in production of flake-like crystals having a more uniform shape.

Method of effecting addition of ammonia is to hydrolyze of urea. In this case, urea initially dissolved in a starting solution containing zinc sulfate is subsequently hydrolyzed to produce ammonia, the hydrolysis reaction being represented by the following formula.

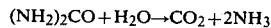

$$(NH_2)_2CO + H_2O \rightarrow CO_2 + 2NH_3$$

This hydrolysis reaction proceeds only very slowly in the vicinity of room temperature, but if temperature of the solution is raised to 50° to 100° C., ammonia is produced, the pH of the solution is increased and flake-like crystals of basic zinc sulfate are deposited at a suitably rapid rate. The precipitation of crystals first becomes noticeable when solution temperature is 50° C., and is completed in a very short time if solution temperature is raised to 100° C., at which temperature hydrolysis of the urea proceeds at very fast rate, thus resulting from the supply of a large amount of ammonia into the solution. Apart from the method as described above, large flake-like crystals can be deposited by addition of urea little by little into a solution of zinc sulfate preliminarily heated up to temperatures of 50° to 100° C. In terms of mole ratio with respect to the zinc sulfate, the amount of urea initially included in the starting fluid may be as low as 0.1, but in order to achieve a satisfactory yield rate of crystals, it is preferably 1 or more, with an upper limit of 6, no advantage being achieved by addition of urea in an amount greater than this upper limit.

Crystals of basic zinc sulfate may also be produced with the use of ammonia instead of urea, when the ammonia water is gradually added drop-wise into the starting solution of zinc sulfate at temperatures of 50° to 100° C. and being stirred. However, in the case where ammonia water is employed, the deposited crystals available have very small diameters of only less than 1 μm, because with the use of ammonia water, reaction speed with respect to zinc sulfate becomes too fast to allow sufficient growth of the deposited crystals. Since urea produces ammonia through hydrolyzing, reaction proceeds gradually to permit crystals to grow sufficiently up to the average particle diameter in the region from 1 μm to several hundred μm.

Powder X-ray diffraction analysis of crystals produced by the above-described method showed that the crystals which were hexagonal, had good uniformity of shape, crystal thickness ranged from about 1 μm to 30 μm, and that ratio of thickness to diameter ranged from 1:5 to 1:300, i.e., the crystals were definitely flake-like and suited to production of crystal-oriented materials. Further, thermogravimetric analysis of the crystals obtained showed that there is a reduction of weight of the crystals occurs in 3 to 4 stages in the temperature region 50° to 400° C. This reduction of weight is presumed to be due to dehydration which occurs in the noted temperature region, as may be expected since immediately subsequent to production thereof, the crystals have considerable water content. When the crystals were further heated, there was found to be a further loss of weight, due to loss of sulfur trioxide gas, $SO_3$, in the temperature region 700° to 900° C. The final product remaining is zinc oxide, ZnO, and by calculation it is found that the original composition of the product crystals was $ZnSO_4 \cdot XZn(OH)_2$, with X in the range 1.7 to 4.8, as noted earlier.

The above-described material was further treated by suitable processes to convert it to zinc oxide and zinc sulfate, and it was found that even after such conversion crystals still remained generally hexagonal and flake-like. In other words, flake-like basic zinc sulfate crystals according to the invention are suitable as starting materials for other zinc compounds for use as crystal-oriented materials such as required in electronic devices. It will also be noted that the method of the invention does not require special equipment, and that starting solution is not required to be heated above 100° C., which is easily, and economically achievable.

The description of the invention continues below in reference to several specific examples thereof.

EXAMPLES 1 TO 11

Zinc sulfate and urea were dissolved in 1 liter of water, and this solution was heated, while being stirred, to cause hydrolysis of the urea. Deposition of a white precipitate commenced when the solution was at a temperature of 50° to 100° C., and with stirring continued and temperature maintained constant, deposition of precipitate was completed in 15 to 20 minutes. The precipitate was then filtered, washed, and dried at a temperature of 80° C. The product was a white powder constituted by colorless, transparent, flake-like hexagonal crystals and having a maximum particle size of 100 μm. Thermogravimetric analysis showed that, discounting crystal water and other water components, the chemical composition of this product also was $ZnSO_4 \cdot XZn(OH)_2$, with X in the range 1.7 to 4.8. A portion of the product was dried in air for 1 hour at 900° C., and there was obtained a large amount of orientable zinc oxide retaining a flake-like hexagonal structure. Also, by drying the product in a sulfurizing atmosphere there was obtained zinc sulfate powder retaining a flake-like hexagonal structure and hence suitable as a crystal oriented material.

Further details relating to Examples 1 to 11 are given in Table 1, which indicates zinc sulfate and urea concentration in the starting solution, temperature at which stable deposition of precipitate takes place, pH of the starting solution at commencement of stable deposition of precipitate, average diameter of crystals obtained, thickness to diameter ratio, and value of X in the formula $ZnSO_4 \cdot XZn(OH)_2$ of the crystals obtained, as determined by thermogravimetric analysis. In Table 1, those deposited by the simultaneous method, with the thickness of the former being also several ten times larger than that of the latter.

TABLE 3

| Example | Deposition method | ZnSO₄:Urea (mol/l) (mol/l) | Deposition temperature (°C.) | Diameter of basic zinc sulfate crystal (μm) | Thickness-diameter ratio |
|---|---|---|---|---|---|
| 22 | Simultaneous method | 1:3 | 80 | 15 | 1:15 |
| 23 | Drop-wise addition method | 1:3 | 80 | 15 | 2:15 |
| 24 | Simultaneous method | 1:3 | 90 | 50 | 1:20 |
| 25 | Drop-wise addition method | 1:3 | 90 | 70 | 1:7 |
| 26 | Simultaneous method | 1:3 | 100 | 120 | 1:100 |
| 27 | Drop-wise addition method | 1:3 | 100 | 100 | 1:10 | and also Table 2, since there was a large variation of particle diameter, approximate average values of diameter are given, and similarly approximate average values of thickness to diameter ratio are given.

EXAMPLES 12 TO 21

In these Examples a portion of the zinc sulfate in the starting solution was replaced by other zinc salts, and the process was otherwise the same as for Examples 1 to 12, there being similarly produced, flake-like zinc compound crystals. Details relating to these examples are given in Table 2, which indicates the same items as Table 1.

TABLE 1

| Example | Conc. mol/liter Starting solution | Alkali | Deposition temperature (°C.) | Deposition pH | diameter (μm) | Thickness-diameter ratio | Value of X [ZnSO₄ . XZn(OH)₂] |
|---|---|---|---|---|---|---|---|
| 1 | ZnSO₄-0.2 | Urea-0.2 | 82 | 5.6 | 15 | 1:15 | 4.8 |
| 2 | ZnSO₄-1.0 | Urea-1.0 | 89 | 4.6 | 30 | 1:10 | 1.7 |
| 3 | ZnSO₄-1.0 | Urea-3.0 | 90 | 4.7 | 50 | 1:20 | 4.6 |
| 4 | ZnSO₄-0.12 | Urea-1.2 | 95 | 5.7 | 70 | 1:50 | 3.8 |
| 5 | ZnSO₄-8 | Urea-24 | 100 | — | Not flaky | — | — |
| 6 | ZnSO₄-1 | Urea-3 | 60 | 4.7 | 30 | 1:270 | 2.5 |
| 7 | ZnSO₄-1 | Urea-3 | 80 | 4.7 | 60 | 1:50 | 2.4 |
| 8 | ZnSO₄-1 | Urea-3 | 100 | 4.7 | 120 | 1:100 | 2.9 |
| 9 | ZnSO₄-0.1 | Urea-3 | 100 | 5.8 | 60 | 1:40 | 2.5 |
| 10 | ZnSO₄-1 | Urea-0.1 | 100 | — | 10 | 1:20 | 2.6 |
| 11 | ZnSO₄-1 | Urea-3 | 50 | 4.6 | 5 | 1:50 | 2.5 |

TABLE 2

| Example | Conc. mol/liter Starting solution | Alkali | Deposition temperature(°C.) | Particle diameter(μm) | Thickness-diameter ratio | Value of X [ZnSO₄ . XZn(OH)₂] |
|---|---|---|---|---|---|---|
| 12 | ZnSO₄0.5 + Zn(NO₃)₂0.5 | Urea-1 | 100 | 80 | 1:8 | 2.5 |
| 13 | ZnSO₄0.75 + Zn(NO₃)₂0.25 | Urea-1 | 100 | 70 | 1:7 | 2.5 |
| 14 | ZnSO₄0.25 + Zn(NO₃)₂0.75 | Urea-1 | 100 | 40 | 1:30 | 2.5 |
| 15 | ZnSO₄0.5 + Zn(NO₃)₂0.5 | Urea-3 | 94 | 100 | 1:10 | 2.4 |
| 16 | ZnSO₄0.5 + Zn(CH₃COO)₂0.5 | Urea-3 | 98 | 120 | 1:13 | 4.8 |
| 17 | ZnSO₄0.18 + Zn(CH₃COO)₂0.04 | Urea-0.6 | 98 | 90 | 1:8 | 2.9 |
| 18 | ZnSO₄0.75 + ZnCl₂0.25 | Urea-3 | 94 | 75 | 1:20 | 3.5 |
| 19 | ZnSO₄0.75 + ZnI₂0.25 | Urea-3 | 85 | 30 | 1:20 | 2.7 |
| 20 | ZnSO₄0.5 + (NH₄)₂Zn(SO₄)₂ | Urea-1 | 90 | 70 | 1:10 | 2.3 |
| 21 | ZnSO₄0.5 + Zn(HCOO)₂ | Urea-3 | 92 | 30 | 1:30 | 3.8 |

EXAMPLES 22 TO 27

With respect to the method for crystal deposition by heating the mixed solution of zinc sulfate and urea (simultaneous method), and that by adding urea drop-wise into the solution of zinc sulfate preliminarily heated (drop-wise addition method), comparison was made on the flake-like crystals of deposited basic zinc sulfate, the results of which are shown in Table 3 below. It is seen from Table 3 that the flake-like crystals of basic zinc sulfate deposited by the drop-wise addition method are generally larger in the average particle diameter than Although the present invention has been fully described by way of examples, it should be noted that various changes and modifications are apparent to those skilled in the art. Therefore, unless otherwise such changes and modifications depart from the scope of the present invention, they should be construed as included therein.

What is claimed is:

1. Method for preparing flake-like crystalline particles of the formula $ZnSO_4 \cdot XZn(OH)_2$ wherein $X = 1.7$–$4.8$, having a ratio of thickness to diameter of 1:5 to 1:300 and a diameter of 1 μm or more which comprises:

(a) preparing a solution of 0.1 to 6 moles per liter of no more than two zinc salts selected from the group consisting of zinc nitrate, zinc sulfate, zinc acetate, zinc chloride and zinc iodide and wherein and wherein at least 25 mol percent of said zinc salts is zinc sulfate:

(b) precipitating the flake-like crystalline particles at a temperature of 80° to 100° C. and a pH of 4.0 to 6.5 by the gradual addition of urea to said solution of step (a) and (c) separating said flake-like crystalline particles from said solution whereby said flakes have a thickness to diameter ratio of from 2–10 times that obtained when all of the urea to be added is present in step (a).

2. Method according to claim 1 wherein the urea is added dropwise.

3. Method according to claim 1 wherein said zinc salts contain zinc iodide in an amount of 25 mol % of said zinc salts.

4. Method according to claim 1, wherein said zinc salts contain zinc nitrate in an amount up to 75 mol % of said zinc salts.

5. Method according to claim 1, wherein said zinc salts contain zinc acetate in an amount up to 50 mol % of said zinc salts.

6. Method according to claim 1, wherein said zinc salts contain zinc chloride in an amount up to 25 mol % of said zinc salts.

* * * * *